Figure 1:
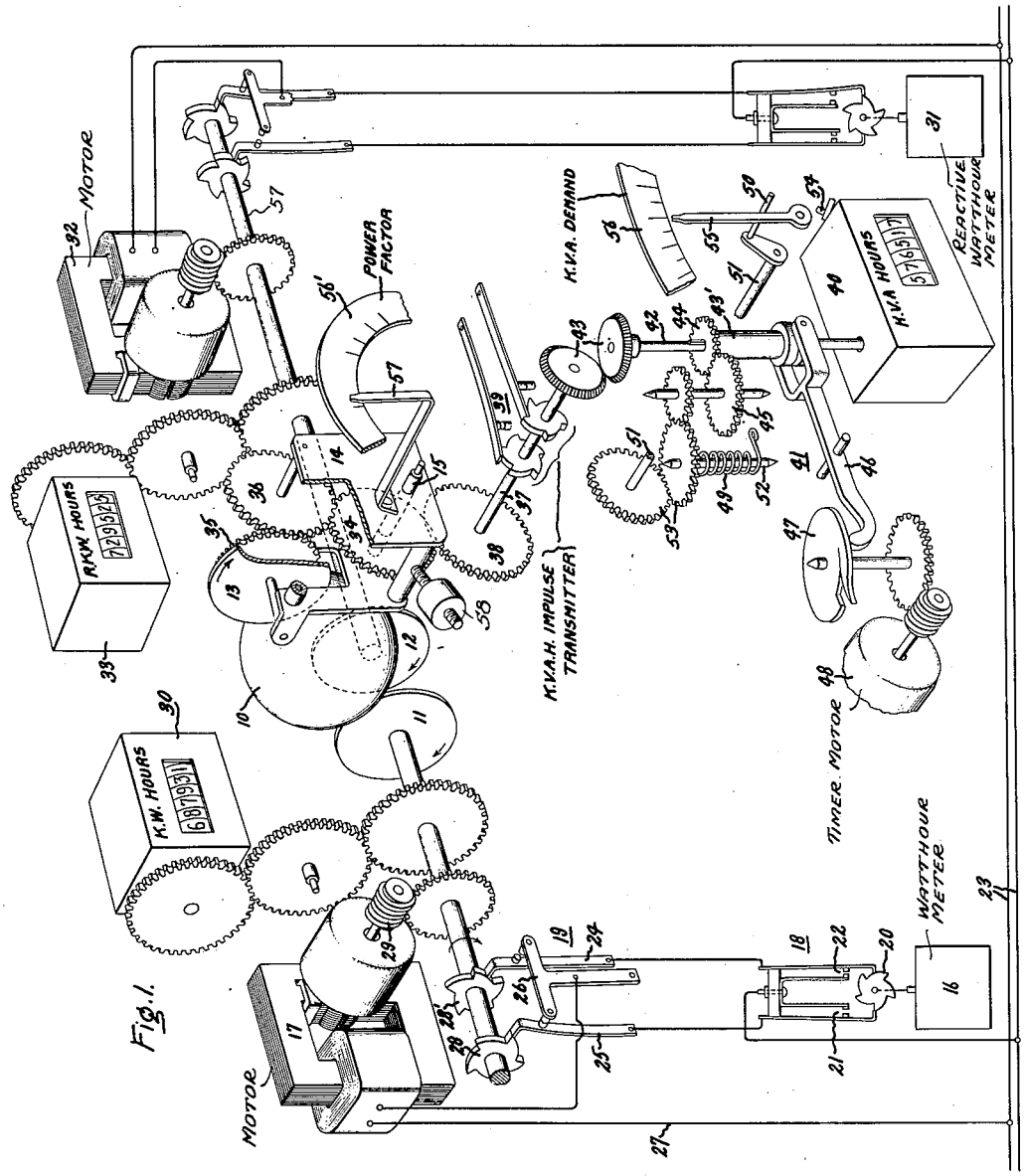

Jan. 14, 1941.  L. K. YERGER  2,228,802
IMPULSE KILOVOLT AMPERE METER
Filed Nov. 16, 1939  2 Sheets-Sheet 1

Inventor:
Lloyd K. Yerger,
by Harry E. Dunham
His Attorney.

Jan. 14, 1941.  L. K. YERGER  2,228,802
IMPULSE KILOVOLT AMPERE METER
Filed Nov. 16, 1939   2 Sheets-Sheet 2
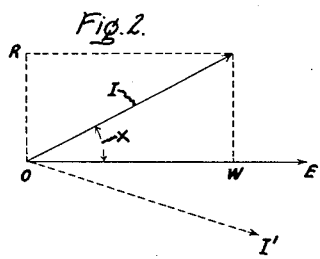
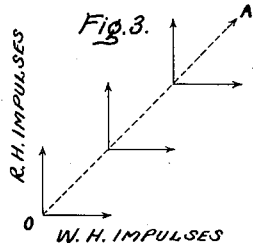
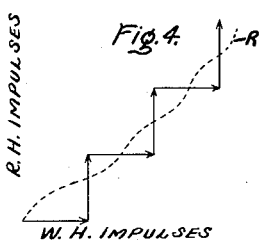
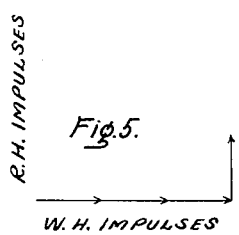
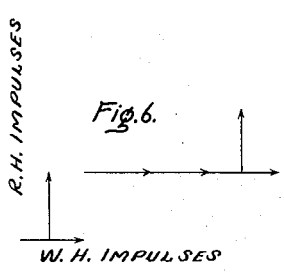
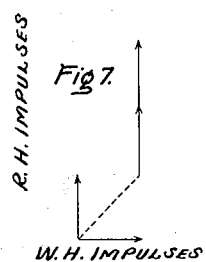
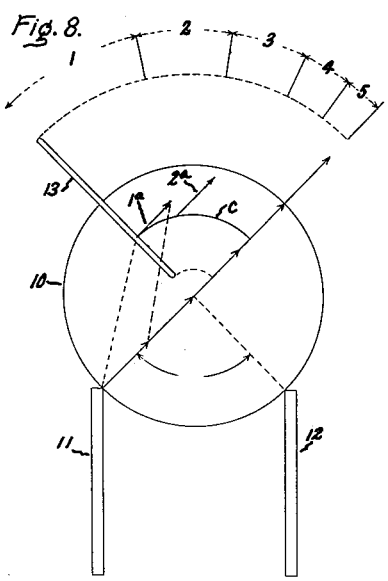
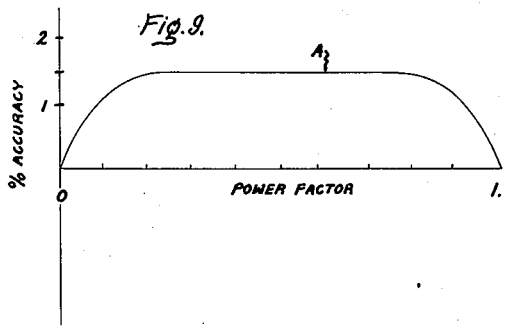
Inventor:
Lloyd K. Yerger,
by Harry E. Dunham
His Attorney.

Patented Jan. 14, 1941

2,228,802

UNITED STATES PATENT OFFICE 2,228,802

IMPULSE KILOVOLT-AMPERE METER

Lloyd K. Yerger, Buffalo, N. Y., assignor to General Electric Company, a corporation of New York Application November 16, 1939, Serial No. 304,770

7 Claims. (Cl. 171—34)

My invention relates to a system and apparatus for obtaining a volt-ampere measurement in response to impulses received from standard integrating meters, for example, from a watthour meter and from a reactive component meter.

United States Patent 1,256,234 describes a mechanism consisting of a sphere which is driven at one point by a watthour meter at another point by a reactive component meter in such a way that the resultant rotation of the sphere is proportional to volt-ampere hours, and a volt-ampere register is driven from the sphere by a friction wheel which rides on the sphere at the point of maximum rotation. Such device has the disadvantage that it requires so much torque from the driving meters that it interferes with their accuracy.

My invention relates to apparatus having such a vector summation sphere operated in response to impulses received from standard meters. By this arrangement detrimental loading of the integrating meters is avoided. The sphere may be made larger and heavier and the contact driving pressures used can be increased so that considerable rugged registering equipment may be driven therethrough without danger of error due to slipping at the driving surfaces. In adopting this scheme, however, it is necessary to smooth out the impulse driving effect and to arrange the apparatus so that the accuracy of registration is independent of the relative rates and the relative times of occurrences of the two sets of impulses, since these conditions will vary over a wide range.

The features of my invention which are believed to be novel and patentable will be pointed out in the claims appended hereto. For a better understanding of my invention, reference is made in the following description to the accompanying drawings in which Fig. 1 shows a perspective view of impulse responsive volt-ampere registering equipment embodying my invention; Fig. 2 is a vector diagram explanatory of the measurements utilized in my invention; Figs. 3 to 7 inclusive are vector representations of different kinds of impulses showing several examples of how the impulses may vary under different conditions; Fig. 8 is a diagrammatic representation of the sphere and connected parts explanatory of the extent to which the sphere should be rotated per impulse in order to substantially eliminate errors due to staggering of the two different kinds of impulses; and Fig. 9 is a curve showing the accuracy behavior of the apparatus under different power factor conditions.

In Fig. 1, a sphere 10 is supported at three points; one point being a connection with the sharp corner of a driving wheel 11, another point being a sharp corner of a driving wheel 12 and the other point being a connection to the rounded edge of driven wheel 13. The driving wheels 11 and 12 make contact at points on the sphere on radii of the sphere which are at approximately 90 degrees to each other or at points spaced approximately one-fourth of the circumference of the sphere. Wheels 11 and 12 have the same fixed axis of rotation, run in the same direction and largely support the weight of the sphere above them. The center of the sphere is forward of a vertical plane through the axis of rotation of the driving wheels such that the sphere tends to fall forward into contact with driven wheel 13, which thus prevents the sphere from falling and this three-point suspension maintains the sphere freely rotatable and in driving connection at all points of contact.

The driven wheel 13 is mounted for rotation in a framework 14 which framework is freely pivoted for rotation about a shaft 15 on an axis which passes through the center of the sphere midway between the disks 11 and 12, and the axis of rotation of wheel 13 is at right angles to the shaft 15. This framework 14 may be rotated about its shaft 15 while one point of the periphery of wheel 13 is maintained in driving and supporting contact with the surface of the sphere. The framework 14 is limited in its rotary movement about shaft 15 to an angle of about 90 degrees, 45 degrees each way from a point where wheel 13 is in its highest position directly above the shaft 15. Wheel 13 thus always helps to support the sphere and to maintain it in a fixed position bodily but allows the sphere to rotate in such position and drive wheel 13. As thus arranged, if wheel 11 be driven at a steady rate proportional to the watts of an alternating current circuit and wheel 12 be driven at a steady rate proportional to the reactive component of the same circuit, the resultant rotation of the sphere will be proportional to the volt-amperes of the circuit. The axis of rotation of the sphere, however, changes with changes in the power factor of the circuit and in order that the driven wheel 13 be driven at a rate proportional to volt-amperes, theoretically it must adjust its position about shaft 15 so as to always ride on the fastest rotating circumference of the sphere, or it must keep its axis of rotation parallel with the axis of rotation of the sphere. The fact that the framework 14 in which wheel 13 is mounted is rotatable about the axis of shaft 15 through the center of the sphere and the fact that wheel 13 is driven in the direction indicated tends to allow such adjustment of wheel 13 to take place automatically and hence to be driven at a rate proportional to volt-amperes, if such adjustment is correctly maintained. Such is the theory of the mechanical vector resultant mechanism of Patent 1,256,234 here utilized to a remarkable degree of accuracy when it is realized that the wheels 11 and 12 are to be advanced in response to impulses rather than directly by meters. This point will be explained more fully after the complete mechanism has been described.

Wheel 11 is rotated intermittently at an average rate proportional to the rate of impulses originating in an impulse device driven by a watthour meter 16. In order that the impulse effect may be smoothed out, wheel 11 is preferably driven by an electric motor 17 controlled by the impulses. The impulse control circuit includes a double contactor 18 driven by the watthour meter for energizing motor 17 and a double contactor 19 driven by the motor for deenergizing the motor. These contactors may be alike. They produce similar contact-making and breaking operations. The contactor 18 is operated by a single cam wheel 20 driven by the watthour meter and has two sets 21 and 22 of cam operated contacts which open and close alternately. It is important, however, that in this operation, contacts 21 open before contacts 22 close and vice versa. In the illustration, contacts 22 have just opened and contacts 21 are about to close and will do so when its movable contact drops off the adjacent step in the cam. The stationary contacts are connected together to one side of an alternating current source of supply 23.

The movable contact of set 21 is connected to the movable contact 25 of contactor 19. The movable contact of set 22 is connected to movable contact 24 of contactor 19. The common relatively stationary contact member 26 of contactor 19 is connected to one terminal of motor 17 and the other motor terminal is connected by wire 27 to the other side of source 23. Two cams 28 and 28' are provided for operating contactor 19. In the illustration, the contacts 25 and 26 are closed and the contacts 24 and 26 are open. As cam 28 rotates, contactor 25 will drop off of its cam step and open its contact with 26. In the meantime contact 24 has been lifted by its cam to a point where it will engage with contact 26 when the latter is lowered by contactor 25 dropping off of its cam. The common contact 26 moves up and down slightly to assist in the closing operations.

It is seen that in the illustration motor 17 is deenergized and hence is stationary. It is about to be energized by the closing of contacts 21, assuming meter 16 is to be rotating. When this happens, motor 17 will start and after rotating cam 28 in the direction indicated, a short distance, will open its circuit between contacts 25 and 26, thus stopping the motor. Contacts 24 and 26 have now closed and as soon as meter operated contacts 22 close, motor 17 will again be energized until contact 24 drops off of its cam. Cams 28 and 28' are on the shaft of and are driven with wheel 11 by motor 17 through worm gear 29. Thus it is seen that wheel 11 is rotated in accordance with the number of impulses received and independently of their duration, but the rotary action is considerably smoother than what is ordinarily considered as an impulse response. Sudden starting of drive wheels 11 and 12 such as would be caused by direct impulses is absent and there is no slipping at the driving surfaces.

Certain precautions are necessary in connection with the impulse system for its practicable use. The impulses come in at any rate from zero when the meter 16 is stopped to a maximum rate when meter 16 is operating at maximum speed. It has been found that the maximum impulse rate should preferably not be greater than about one impulse per second. The motor 17 must have certain characteristics. It is not essential that it be a synchronous motor or even a strictly constant speed motor. It is important, however, that it be capable of stopping fairly quickly and consistently when deenergized. It must start and register an impulse and be deenergized again in a time not greater and preferably slightly less than the duration of an impulse when the impulses are coming in at a rapid rate, since the motor can be energized through the meter operated contacts only so long as these contacts remain closed when operating at the maximum rate. If the motor failed to do this, the motor driven contactor would get out of step with the transmitting contactor and impulses would be lost. It is also desirable that the motor operate as long as possible during these maximum rate impulses because this makes for smoother rotary action at the receiver. With the five step cams illustrated in Fig. 1 they should turn not less than $\frac{1}{10}$ revolution per impulse so that as the motor is deenergized at one contact and the cam stops, the other contact will have closed. Also these cams must turn less than $\frac{1}{5}$ revolution per impulse because if they turn further than this, the contact which has just opened will close again before the motor stops. After a motor has been deenergized it coasts a little before it actually comes to a stop and motors in general coast further when warm than when cold, due primarily to the change in viscosity of the oil used in the bearings. A warm motor may also come up to speed slightly quicker than a cold motor. The motor-coasting distance of the motor when connected to the load represented must be taken into consideration when selecting the arrangement to be used. It has been found that a motor such as described in Warren Patent No. 1,495,936, May 27, 1924 having a terminal shaft speed of one revolution per second is satisfactory for this purpose. This refers to the speed of the shaft on which worm gear 29 is located. A satisfactory arrangement exists when the terminal shaft makes from three-fourths to one complete revolution per impulse including coasting. It is important that the motor be deenergized at one contact 25—26 and the other contact 24—26 be closed in a time less than one second in the example given. However, the motor may be again energized by the next impulse through contacts 24—26 before it actually stops coasting provided that when the impulses are coming in at a slow rate so that the motor will coast to a stop between impulses, it never rotates a total distance sufficient to reclose the contact which has just opened. This motor thus turns wheel 11 intermittently at an average rate proportional to watthours and also drives a watthour register 30.

At 31 is a reactive component hour meter and it controls a motor 32 which drives wheel 12 in the direction indicated at an average rate proportional to that of the reactive component meter 31. Also it drives a reactive component register 33. The impulse system between meter 31 and motor 32 is the same as that already described. Meters 16 and 31 are of course connected to meter the same alternating current circuit and the impulse transmission ratios between the meters and their registering devices are the same.

Now that I have arranged for driving the sphere 10 with power motors rather than by meters, the sphere and the parts driven thereby may be made sufficiently heavy and rugged that considerable metering equipment may be driven therefrom without meter errors and without slipping. In order that the rotation of wheel 13 may be utilized for such purpose regardless of the rotary position of the supporting framework 14, it is geared to a gear 34 which has a bearing on shaft 15 and hence on the axis of rotation of framework 14. The axis of rotation of gear 34 does not shift when framework 14 shifts and hence gear 34 can be used to drive a metering shaft either directly or through conventional gearing. The driving connection between wheel 13 and gear 34 is through a gear 35 which may be integral with wheel 13 and a gear 36 meshing with gear 35 at right angles thereto. The axis of rotation of gear 36 shifts with the framework about shaft 15 as a center and hence is always in mesh with gear 34.

Gear 34 drives a shaft 37 through a gear 38. Shaft 37 drives a contact device represented at 39 in order that impulses corresponding to volt-ampere hours may be transmitted to one or more distant meter receivers for indicating, integrating or recording volt-ampere hours or volt-ampere demand. Shaft 37 also drives a volt-ampere register 40 and a volt-ampere demand meter 41 of any suitable type. In the arrangement illustrated by way of example shaft 37 drives a shaft 42 through gears 43. Register 40 is driven from shaft 42. On shaft 42 is splined a sleeve 43' which rotates with shaft 42 but is slidable along the shaft. The sleeve 43' is normally in the position shown where a gear 44 thereon meshes with a gear 45 leading to the demand indicating mechanism. At predetermined time intervals sleeve 43' is raised to momentarily demesh gears 44 and 45 by a lever 46 actuated by a cam 47, which cam is driven at constant speed by a clock motor indicated at 48. The gear 44 is returned to the inmesh position automatically as soon as permitted by the cam arrangement. When in mesh and when being driven from the volt-ampere meter, gears 44 and 45 wind up a spring 49 and also rotate a pusher member or dog 50. Dog 50 is on a shaft 51 geared to the spring winding shaft 52 through the gears shown at 53. When gears 44 and 45 are demeshed, spring 49 unwinds and returns the dog 50 against a zero stop shown at 54. When the gears 44 and 45 are in mesh, the dog 50 moves a friction pointer 55 up-scale and in a counter-clockwise direction, as shown here, for convenience. Pointer 55 indicates on a scale 56. It remains in the position to which advanced when the dog returns to a zero position and hence the pointer indicates maximum volt-ampere demand. It will be understood that the apparatus which is driven by shaft 37 may be any suitable type of metering equipment and the devices here represented, as being thus driven, are illustrated by way of example.

At 56' is a scale graduated in power factor units, and a pointer 57 fastened to framework 14 indicates on such scale. If the rotary position of the framework is accurately maintained in a position corresponding to the true resultant rotation of the average watt and reactive watthour components, pointer 57 will indicate the power factor of the circuit metered by the meters 16 and 31. However, as will be presently explained, the rotary position of the framework may be only a rough approximation of the true power factor position under certain conditions and hence it is not contended that the power factor indication obtained is accurate at all times.

In Fig. 2 I have vectorially represented at E the voltage of an alternating current power circuit and at I the current of such circuit. The current lags behind the voltage by an angle X and hence the circuit under these conditions has a lagging power factor less than unity corresponding to the cosine of the angle of lag, thus the power factor=cos X. This is the usual condition of alternating current circuits intended to be metered by the apparatus described, although it will be appreciated that the angle X may vary considerably and that the meters 16 and 31 may be polyphase meters and measure polyphase watthours and polyphase reactive component hours. The watthour meter 16 measures the in-phase or watt component or, referring to Fig. 2, the product of $EI \cos X$ or $OW \times OE$. The reactive component meter measures the reactive component or $EI \sin X$ or $OR \times OE$.

At unity power factor the reactive component meter 31 would not run at all and if the current vector shifted to position OI', corresponding to a leading power factor, the reactive component meter would reverse its direction of rotation. The equipment described is not adapted or intended to measure volt-ampere hours for both lagging and leading power factors. A leading power factor load is rare and hence it is generally beneficial because it helps to improve the power factor of the system from which other lagging power factor loads are supplied. The equipment described is to be used primarily for measuring lagging volt-ampere hour maximum demand, since it is this factor that power companies desire to determine in order to arrive at proper promotional rates. The apparatus described when arranged for that purpose does not have its lagging volt-ampere measurement changed or reduced in case the reactive volt-ampere meter should reverse, due to a leading power factor and this is an advantage. Should the system record a leading power factor the customer would be penalized unfairly. It will be noted that the impulse system between meter 31 and the receiver would simply cease to function if meter 31 ran or attempted to run backwards. Neither the contact cam driven by or in response to meter 31 nor the driving shaft 57 for wheel 12 can rotate backwards because the contact devices, as arranged, prevent this. Also, motor 32 runs only in the proper direction of rotation. Hence the apparatus described responds only to lagging volt-amperes. It could of course be arranged to respond only to leading volt-amperes by either reversing the direction of rotation of meter 31 or reversing its impulse transmitting cam wheel.

It will be evident that when the apparatus is in operation for measuring lagging volt-ampere hours, the two sets of impulses may come in simultaneously or alternately or in overlapping relation at a power factor where the impulse rates of both meters are equal. At higher power factors the watthour impulses will come in faster than the reactive component impulses, while at lower power factors the reverse will be true. It is thus seen that there is no way of predicting just how the two sets of impulses will come in, either as regards their relative rates or as regards the manner in which they may be staggered. It is therefore desirable to arrange matters so that the apparatus will register volt-ampere hours, as far as possible, independently of these factors. A staggered relation of the rotational impulses shifts the axis of rotation of sphere 10 back and forth independently of power factor changes. I have found that the apparatus can be made to operate with a far greater accuracy and consistency under various power factor conditions than would seem to be possible and without pretending to fully understand just why this is so, I offer what I believe to be the explanation and point out certain relations which I have found will give satisfactory results.

In Fig. 3 let the horizontal arrows represent watt-hour component impulses and the vertical arrows reactive component impulses as converted into rotational components of equal time and distance by the motors 30 and 32. As here represented, the impulses are coming in at the same rate and simultaneously. This corresponds to a power factor angle of 45 degrees and equal rates of operation of the two impulse-sending meters. Under these conditions the sphere 10 and the wheel 13 which it drives will obviously perform in accordance with the theory of Patent 1,256,234. The wheel 13 will ride on the fastest rotating point of the sphere and rotate a distance directly proportional to volt-amperes, which we may represent by the resultant vector OA. In Fig. 4 I have represented the same impulse rate and power factor but the impulses are staggered instead of coming in simultaneously. Under these conditions, if wheel 13 is always to ride on the fastest rotating point of the sphere, it will turn its framework about shaft 15, 90 degrees between the impulses and in effect follow the stair step line formed by the impulse arrows. If it does this it will rotate a distance considerably greater than the vector sum of the impulse vectors and produce an excess error of about 40%. Figs. 5 and 6 represent typical impulse for a higher power factor condition than is represented in Fig. 6. It is evident that in both cases there would be a serious over-registration error if wheel 13 always rode on the fastest rotating point of the sphere, the assumed error being slightly less in Fig. 6 where there is only a partial staggering of the watthour and reactive component hour impulses.

Fig. 7 represents a low power factor impulse condition where the first two impulses from the different meters come in simultaneously followed by two from the reactive component meter. Here the assumed error in registration would be slightly less than in Fig. 6.

According to the way my apparatus is arranged, the assumed errors explained above do not exist except to a very minor degree. In my apparatus the wheel 13 rarely rides on the fastest rotating point of the sphere and would do so continuously only if some such condition as is represented in Fig. 3 is maintained over a number of impulses, in which case the wheel 13 can ride on the fastest rotating point of the sphere.

As shown in Fig. 1, where five-point impulse-receiving staggered cams are used, the wheels 11 and 12 which drive the sphere rotate, on the average, $\frac{1}{10}$ revolution per impulse. In other words, an incoming impulse drives sphere 10, even at its fastest rotating point, a distance much less than the distance which wheel 13 would have to travel about the sphere, (swinging about shaft 15) in order to maintain contact with the fastest rotating point on the sphere under the assumed conditions represented in Figs. 4, 5, 6 and 7. Wheel 13 cannot do this. In the first place when it starts to swing, it is in contact with a point of the sphere which rotates at less speed than the highest peripheral speed point. If this were not so, the wheel 13 would not swing. In the second place this swinging movement of the wheel 13 towards the high speed point of the sphere is in a direction more or less crosswise to the direction in which the sphere is rotating at the point of contact. The result is that wheel 13 when out of the theoretically correct position, does not rotate even as fast as the sphere at the point of contact. Its movement is partially rotation on the sphere and partially a sidewise movement across the sphere and the greater the displacement from the theoretically correct position, the greater will be the sidewise movement and less the rotational movement, both because it is on a slow-moving point of the sphere and because it is cocked at a greater angle to the direction of rotation of the sphere at the point of contact.

If a rotational impulse were much longer than the example given, for example if a rotational impulse rotated the sphere two or three complete revolutions instead of a small fraction of a revolution, then the wheel 13 would have time to shift its position during the early part of such an impulse and would then tend to follow the stair step impulse line of Fig. 4 much more closely than is possible when the rotational impulses are short as contemplated. I prefer to so proportion the rotational length of the impulses to the size of the sphere that it will require not less than five impulses and preferably more of one kind to shift the wheel from one extreme position to the other. For example, in Fig. 8, assume the wheel 13 is in the position shown, that wheel 12 receives no impulses and is stationary and that impulses are coming in and rotating wheel 11. Such impulses may be represented in magnitude and direction by the five large arrows drawn across the diameter of the sphere in the direction in which they cause the sphere to rotate. It should require at least five such impulses to swing wheel 13 from the position shown through an angle of 90 degrees to a position in line with the fastest rotating part of the sphere. If this is done, the device has a plus registration error of not more than 2% under al conditions which are likely to be encountered in practice. Let the angles numbered 1 to 5, inclusive, represent the extent to which the wheel 13 is turned for the respective impulses. Also let the small arrow 1a represent the direction and extent of movement of the sphere at the point of contact with wheel 13 for the first impulse. Arc C then represents the path of contact between wheel 13 and sphere 12. It is seen that the first impulse produces a motion (1a) of the sphere at its point of contact with wheel 13 which is somewhat less than the motion of the fastest moving point on the sphere represented by the length of a large arrow, and much less than the distance the wheel 13 has to shift across the sphere to get in line with the motion of the sphere. Also, this movement is at first sideways of wheel 13. Hence it causes little rotational movement of wheel 13 but largely a sidewise swinging movement about an axis through the center of the sphere. For the second impulse, the wheel 13 is on a point of the sphere which moves somewhat faster, as represented by the arrow 2a, and the wheel has been turned through the angle 1 so that it receives more of a rotational component and less of a sidewise component. However, the wheel 13 does not reach the fastest moving part of the sphere or receive the impulse effect as a full rotational component until the end of the fifth impulse.

It is thus seen why the assumed theoretical errors explained in connection with Figs. 4 to 7, inclusive, are practically eliminated. The relations represented in Fig. 8 are illustrative and are not intended to represent exact conditions.

Now it is apparent that if we had impulses coming in in the manner represented in Fig. 4 and sphere 13 rotated such a distance for each impulse, as is represented for the total five impulses of Fig. 8, for example, the wheel 13 would swing through an angle of 90 degrees for each impulse and would then tend to follow the stair step line of Fig. 4 much more closely than it actually does, where the rotation of the sphere per impulse is made small. According to my invention the wheel 13 can be considered as following a path somewhat as represented by the dotted line R, when the conditions are such as represented in Fig. 4. This line is not straight and hence it is apparently longer than the line OA, Fig. 3, as actually drawn. However, it should also be remembered that the contact point of wheel 13 with sphere 10 is a point at which the sphere generally rotates slower and never faster than the point of maximum peripheral speed, whereas the length of the impulses represented in Fig. 4 represents the travel of the maximum peripheral speed of the sphere. Hence, if line R could be drawn to the same distance scale as the impulses, it would be shorter than represented.

I have demonstrated the accuracy of apparatus built in accordance with my invention and obtained an accuracy curve represented in Fig. 9. In this curve the ordinates represent per cent accuracy and the abscissa represents variation in power factor. The average accuracy curve A was obtained by varying the power factor of the circuit metered by meters 16 and 31 and measuring the speed of volt-ampere hour shaft 37. At 0 and unity power factors the apparatus is accurate. Between these power factors there is an average plus error which is quite consistent and averages 1½% between about .2 and .8 power factor. The impulse sequence was varied through various conditions including those represented in Figs. 4, 5, 6 and 7. The maximum error noted was 1.8%. The apparatus used a solid hardened aluminum sphere one inch in diameter. The drive wheels 11 and 12 and the driven wheel 13 were ¾ inches in diameter. Six-point staggered cams were used in place of the five-point cams shown in Fig. 1 at 28 and 28' and hence the wheels 11 and 12 rotated an average of 1/12 revolution per impulse and the sphere 1/10 revolution per impulse. From my investigation I believe that the sphere should not be rotated in excess of about 7½% of its circumference per impulse. On the average power circuit, where such apparatus will be used, the power factor does not as a rule vary suddenly by a large amount. Also, it will generally vary between certain rather fixed limits. For a circuit, the power factor of which varies between .8 and .2, I may reduce the diameters of the wheels 11 and 12, or else increase the diameter of wheel 13 from the theoretically correct relation of equal diameters by an amount sufficient to eliminate the substantially constant error of 1½% represented in Fig. 9, so that, assuming the device has a constant plus error of 1½%, the volt-ampere hour shaft 37 will rotate at true volt-ampere hour speed. In other words, I may compensate for this substantially constant error by introducing the necessary change in the drive ratio. For a meter for use on a circuit having a variation from unity to .8 power factor the compensation to be introduced would be smaller, for example about 1%. As thus arranged, the error rarely reaches ½ of 1 per cent.

In discussing the error compensation above, it was assumed that the two driving disks 11 and 12 made driving contact with the sphere 10 at exactly the correct theoretical positions, that is, spaced 90 degrees of the circumference. Tests indicate that I may advantageously move the driving wheels 11 and 12 very slightly nearer together than the theoretically correct spacing with a noticeable reduction in the inherent error of the apparatus. This expedient raises the ends of the average accuracy curve shown in Fig. 9 and lowers the central portion so that the curve has less variation between unity and zero power factor. Using a one inch diameter sphere, I have found that moving the wheels 11 and 12 each .004 inch closer to the center of the sphere gave an average negative error of about 0.1% over a power factor range of unity to zero.

Another point that should be mentioned is that the framework 14 should be properly balanced about its axis of rotation and for this purpose I represented the adjustable weight 58.

What I claim as new and desire to secure by Letters Patent of the United States is:

1. Measuring apparatus for alternating current power systems comprising meters for measuring the watt and reactive component hours of such a system, impulse transmitters for transmitting current impulses at rates proportional respectively to the watt and reactive component hour measurements of said meters, impulse receivers electrically connected to said transmitters, said receivers comprising a pair of motor operated contact devices for similarly converting the received impulses into rotational movements of a definite value per impulse, a pair of spaced disks driven by said receivers in the same direction, a sphere partially supported and driven by said disks at points on said sphere spaced approximately one-fourth of its circumference, and a third disk riding on and driven by said sphere and assisting in the support of said sphere and mounted so that it tends to move about the sphere in line with the fastest rotating part of the sphere for integrating the resulting rotation of said sphere in terms of volt-ampere hours.

2. Measuring apparatus for alternating current power systems comprising meters for measuring the watt and wattless component hours of such a system, current impulse transmitters driven by said meters for transmitting impulses at rates respectively proportional to the measurements of said meters, impulse receivers electrically connected to said transmitters comprising electric motors energized by said impulses and including contact devices operated by said motors in their energizing circuits for stopping such motors after conversion of the received impulses into predetermined rotational movements, a pair of spaced disks driven by said receivers in accordance with their rotational movements so as to rotate at average rates proportional to the watt and wattless component hour measurements, said disks being driven in the same direction, means for preventing reverse rotation of said disks in case the controlling meter reverses its direction of operation, a sphere partially supported and driven by said disks at points on the sphere spaced apart approximately one-fourth of its circumference, and a third disk riding on said sphere and partially supporting and driven by said sphere and mounted so that it tends to swing over the sphere in line with the fastest moving part thereof for integrating the resultant rotational movement of said sphere in terms of volt-ampere hours.

3. Apparatus for combining impulses which occur at a rate proportional to the watthours and impulses which occur at a rate proportional to the wattless component hours of an alternating current power circuit into volt-ampere hours comprising a pair of motor driven impulse receivers for converting received impulses into rotational movements such that the summation of the rotational movements of each receiver is proportional to the sum of the impulses received thereby, a pair of spaced driving disks having a common axis of rotation driven in the same direction by said receivers in accordance with their rotational movements, a sphere partially supported and driven by said disks at points on the sphere which are separated by approximately one-fourth of its circumference, a driven disk riding on said sphere partially supporting the sphere and driven thereby, said driven disk being rotatively mounted in a supporting frame which is rotatable about an axis passing through the center of the sphere midway between said driving disks, whereby said driven disk tends to be driven toward and ride upon the fastest rotating part of the sphere, the dimensions of said parts being such that the sphere is rotated a distance not in excess of about 7½% of its circumference per rotational impulse.

4. Apparatus for combining impulses which occur at a rate proportional to the watthours and impulses which occur at a rate proportional to the wattless component hours of an alternating current power circuit into volt-ampere hours comprising a pair of motor operated impulse receivers for similarly converting each received impulse into rotational movements of predetermined magnitude and direction, a pair of similar disks driven by said receivers, a sphere resting on the peripheral edges of said disks so as to be driven thereby at points on the sphere spaced apart by approximately one-quarter of its circumference, a driven disk riding on the surface of said sphere and driven thereby for the purpose of integrating the vectorial resultant rotational movement of said sphere, said driven disk being supported in a frame that is pivoted on an axis passing through the center of the sphere midway between the driving disks, whereby the driven disk tends to swing in line with the fastest rotating part of the sphere, the dimensions and relations of said driving disks and sphere being such that the sphere is rotated not more and preferably less than about 7½% of its circumference per rotational impulse and the driven disk having a slightly greater diameter than the driving disks for the purpose of compensating the vectorial summation principle of said apparatus for errors which may be due to unavoidable staggering of the rotational impulse operations of said receivers.

5. Volt-ampere hour measuring apparatus comprising a disk which is intermittently driven at an average rate proportional to the watthours of a power circuit, a similar disk which is intermittently driven at an average rate proportional to the wattless component hours of the same power circuit such that the rotational impulses of said disks may occur in staggered or overlapping time relation, a freely rotatable sphere driven by said disks at points on said sphere which are spaced apart approximately one-fourth of the sphere's circumference, a third disk riding on and driven by said sphere so arranged that it tends to swing into line with the fastest rotating part of the sphere so as to be driven at a rate proportional to the vector summation of the individual rotary movements of the driving disks but departing from a theoretically correct vector summation operation when the rotational impulses occur in staggered or overlapping relation, the rotational movement of said sphere per rotational impulse of the driving disks being a small fraction of a revolution of such sphere and the size of the driven disk being made slightly larger than the driving disks for the purpose of substantially compensating the vectorial summation operation of the apparatus for errors due to the staggered and overlapping occurrence of the rotation impulses.

6. Volt-ampere demand measuring apparatus comprising a maximum demand meter having a demand measuring part which is advanced in proportion to the demand to be measured, power means for advancing said measurement part at a rate proportional to the volt-ampere hours of a power circuit comprising a freely rotatable sphere, a pair of similar disks rotatively supporting said sphere at points spaced apart approximately one-fourth the circumference of the sphere and for driving the sphere, a pair of motors for driving said disks, impulse energizing and control means for one of said motors for causing the same to rotate intermittently, each such rotational operation being proportional to a given value of watthours of an alternating current power circuit, impulse energizing and control means for causing the other motor to rotate intermittently, each such rotational operation being proportional to the same value of reactive component hours of the same power circuit, a wheel riding on and driven from said sphere, said wheel being mounted in a frame pivoted to swing about an axis through the center of the sphere midway of said driving disks whereby the wheel tends to move into line with and to be driven by the fastest moving part of the sphere but which only approximates such in-line position due to the intermittent manner in which the sphere is driven, a gear wheel mounted for rotation on the axis of rotation of said frame driven from said wheel, and a driving connection between said gear and the aforementioned demand measuring part, whereby said part is positively driven through said wheel, sphere and disks by said motors, the function of said sphere being to vectorially combine the average rotational movements imparted thereto by the disks and drive the wheel at a resultant rate proportional to the vector summation of such rotational movements in terms of volt-ampere hours, said parts being adjusted and related to substantially eliminate errors in such vectorial summation operation and which would otherwise be present owing to the intermittent manner in which said sphere is driven.

7. Apparatus for combining impulses which occur at a rate proportional to the watthours and impulses which occur at a rate proportional to the wattless component hours of an alternating current power circuit into volt-ampere hours comprising a pair of motor driven impulse receivers for converting received impulses into rotational movements such that the summation of the rotational movements of each receiver is proportional to the sum of the impulses received thereby, a pair of spaced driving disks having a common axis of rotation driven in the same direction by said receivers in accordance with their rotational movements, a sphere partially supported and driven by said disks at points on the sphere which are separated by slightly less than one-fourth of its circumference, a driven disk riding on said sphere partially supporting the sphere and driven thereby, said driven disk being rotatively mounted in a supporting frame which is rotatable about an axis passing through the center of the sphere midway between said driving disks, whereby said driven disk tends to be driven toward and ride upon the fastest rotating part of the sphere, the dimensions of said parts being such that the sphere is rotated a distance not in excess of about 7½% of its circumference per rotational impulse.

LLOYD K. YERGER.